(12) United States Patent
Lutter et al.

(10) Patent No.: US 9,193,821 B2
(45) Date of Patent: Nov. 24, 2015

(54) PROCESS FOR PRODUCING VISCOELASTIC FLEXIBLE POLYURETHANE FOAMS

(75) Inventors: Heinz-Dieter Lutter, Lembruch (DE); Jens Mueller, Lohne (DE); Daniel Freidank, Lemfoerde (DE); Theodore M. Smiecinski, Woodhaven, MI (US); Stephan Goettke, Heidelberg (DE); Berend Eling, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 207 days.

(21) Appl. No.: 13/383,238

(22) PCT Filed: Jul. 14, 2010

(86) PCT No.: PCT/EP2010/060094
§ 371 (c)(1),
(2), (4) Date: Jan. 10, 2012

(87) PCT Pub. No.: WO2011/009779
PCT Pub. Date: Jan. 27, 2011

(65) Prior Publication Data
US 2012/0115970 A1    May 10, 2012

(30) Foreign Application Priority Data
Jul. 20, 2009  (EP) ..................................... 09165901

(51) Int. Cl.
| | | |
|---|---|---|
| C08G 18/00 | (2006.01) | |
| C08G 18/63 | (2006.01) | |
| C08G 18/48 | (2006.01) | |
| C08G 18/08 | (2006.01) | |
| C08G 101/00 | (2006.01) | |

(52) U.S. Cl.
CPC .............. C08G 18/632 (2013.01); C08G 18/48 (2013.01); C08G 18/4816 (2013.01); C08G 18/4845 (2013.01); C08G 18/14 (2013.01); C08G 2101/00 (2013.01); C08G 2101/0008 (2013.01); C08J 2375/08 (2013.01); C08J 2375/14 (2013.01)

(58) Field of Classification Search
CPC .. C08J 2375/08; C08J 2375/14; C08G 18/14; C08G 18/4816; C08G 18/4845; C08G 18/632
USPC ......... 521/130, 131, 134, 135, 137, 139, 164, 521/167, 170, 174
See application file for complete search history.

(56) References Cited

U.S. PATENT DOCUMENTS

| 4,689,354 A | 8/1987 | Ramlow et al. |
| 6,013,731 A | 1/2000 | Holeschovsky et al. |
| 8,293,807 B2 * | 10/2012 | Emge et al. ................... 521/134 |
| 2004/0044091 A1 | 3/2004 | Niederoest et al. |
| 2004/0254256 A1 | 12/2004 | Lockwood et al. |
| 2007/0060690 A1 * | 3/2007 | Adkins et al. .................. 524/386 |
| 2007/0254973 A1 * | 11/2007 | Emge et al. .................... 521/170 |

FOREIGN PATENT DOCUMENTS

| EP | 0 008 444 | 3/1980 |
| EP | 0 365 986 | 5/1990 |
| EP | 0 510 533 | 10/1992 |
| EP | 0 640 633 | 3/1995 |
| EP | 0 731 118 | 9/1996 |
| EP | 1 240 228 | 9/2002 |
| WO | 01 04178 | 1/2001 |
| WO | 01 25305 | 4/2001 |
| WO | 02 088211 | 11/2002 |
| WO | 03 078496 | 9/2003 |
| WO | 2007 065837 | 6/2007 |
| WO | WO 2008031757 A1 * | 3/2008 ............. C08G 18/63 |

OTHER PUBLICATIONS

International Search Report Issued Jan. 31, 2011 in PCT/EP10/60094 Filed Jul. 14, 2010.

* cited by examiner

*Primary Examiner* — Michael L Leonard
(74) *Attorney, Agent, or Firm* — Oblon, McClelland, Maier & Neustadt, L.L.P.

(57) ABSTRACT

The invention relates to a process for producing viscoelastic flexible polyurethane foams by reacting
a) polyisocyanates with
b) compounds having at least two hydrogen atoms which are reactive toward isocyanate groups,
c) blowing agents,
wherein the compounds having at least two hydrogen atoms which are reactive toward isocyanate groups b) comprise
b1) from 0 to 90 parts by weight of at least one polyether alcohol consisting of exclusively propylene oxide units or propylene oxide units and not more than 50% by weight, based on the total weight of the alkylene oxides used, of ethylene oxide units in the polyether chain and having a nominal functionality of from 3 to 8 and a hydroxyl number in the range from 100 to 350 mg KOH/g, and
b2) from 10 to 100 parts by weight of at least one graft polyol which can be prepared by in-situ polymerization of olefinically unsaturated monomers in at least one polyether alcohol which has exclusively propylene oxide units or propylene oxide units and not more than 50% by weight, based on the total amount of alkylene oxides used, of ethylene oxide units in the polyether chain, a nominal functionality of from 2 to 8 and a hydroxyl number in the range from 100 to 350 mg KOH/g, having a solids content of not more than 60% by weight, based on the total amount of polyols and solids used,
where the sum of the parts by weight of b1) and b2) is 100.

15 Claims, No Drawings

PROCESS FOR PRODUCING VISCOELASTIC FLEXIBLE POLYURETHANE FOAMS

The invention relates to a process for producing viscoelastic flexible polyurethane foams by reacting polyisocyanates with compounds having at least two hydrogen atoms which are reactive toward isocyanate groups.

Viscoelastic flexible polyurethane foams have attained ever greater importance in recent years. They are used, in particular, for producing upholstery, mattresses or for damping of vibrations, for example in foam backing of carpets.

Viscoelastic flexible polyurethane foams have a glass transition temperature which is in the vicinity of room temperature.

The glass transition temperature is determined by means of dynamic-mechanic analysis (DMA) at a frequency of 1 Hz in the temperature range from −80 to +200° C. The viscoelastic flexible foams of the invention have an absolute maximum value of the loss modulus tan delta in the temperature range from −10 to 40° C., preferably from −10 to 35° C. and in particular from −6 to 35° C. The viscoelastic foams have, in particular, a rebound resilience in accordance with DIN EN ISO 8307 of less than 30% and a high damping performance reflected in a tan delta value of >0.2 at room temperature.

The viscoelastic properties are preferably set by choice of the starting materials, in particular the polyols.

One possible way of producing viscoelastic foams is the use of mixtures of preferably trifunctional polyether alcohols having a hydroxyl number of from 20 to 100 and at least one preferably trifunctional polyether alcohol having a hydroxyl number in the range from 160 to 250 and substantially propylene oxide units in the chain.

A disadvantage of such foams is that, particularly when tolylene diisocyanate (TDI) is used as polyisocyanate, their high proportion of closed cells which leads to problems in processing and to relatively poor mechanical properties.

Furthermore, the viscoelastic properties can be achieved by using mixtures of at least one polyether alcohol having a high content of ethylene oxide, preferably at least 50% by weight, and at least one polyether alcohol which is incompatible with the first polyether alcohols and has a high content of propylene oxide, preferably at least 90% by weight, as compounds having at least two hydrogen atoms which are reactive toward isocyanate groups. Such a method is described, for example, in WO 2007/065837.

US 2004/0254256 describes viscoelastic foams in whose production the polyol component comprises from 30 to 70 parts by weight of a polyether alcohol having a high proportion of ethylene oxide units in the polyether chain. EP 1 240 228 describes the production of viscoelastic foams using polyether alcohols which have a content of ethylene oxide in the polyether chain of at least 50% by weight and a hydroxyl number in the range from 40 to 50.

The use of the ethylene oxide-rich polyether alcohols increases the proportion of open cells in the foams. A disadvantage of the use of polyether alcohols having a high proportion of ethylene oxide in the chain is the increase in the hydrophilicity of the foams. As a result of this, these foams swell by up to 40% by volume in contact with water. This swelling behavior is unacceptable for applications in moist environments. Furthermore, foams having a high content of ethylene oxide have unsatisfactory stability when aged under moist warm conditions.

A further possible way of setting viscoelastic properties is the addition of plasticizers and/or monools, as described, for example, in WO 02/088211. WO 01/25305 additionally describes the use of 30-70 parts of polymer polyol for producing viscoelastic foams.

WO 04/0254256 describes a process for producing viscoelastic foams, in which a mixture of at least one ethylene oxide-rich polyether alcohol and at least one propylene oxide-rich polyether alcohol is used as polyol component. The hydrophilicity of the foams can be adjusted via the ratio of the polyols used.

Other technologies are based on a pneumatic effect, which for the present purposes means that the viscoelastic properties are primarily attributable to the reduced air permeability and the resulting slow resilience of the foams. Under long-term load, the cells are opened, as a result of which the pseudo-viscoelastic effect is reduced with increasing load/use. In contrast to the prior art, flexible polyurethane foams according to the invention have, owing to the polymer matrix, intrinsic viscoelastic behavior combined with a high proportion of open cells and low swelling on contact with water.

A disadvantage of this process is once again the fact that the foams have a hydrophilicity which is too high for many applications.

It was an object of the present invention to provide viscoelastic flexible polyurethane foams which have good mechanical properties, ten, in particular an optimal compression set, in both the dry state and the moist state and can be produced without problems regardless of the polyisocyanate used. Furthermore, the hardness of the VE foams should be able to be set, without a loss in quality, in particular with respect to the rebound resilience and the elongation.

This object has surprisingly been able to be achieved by the compounds having at least two hydrogen atoms which are reactive toward isocyanates comprising a polyether alcohol which is made up substantially of propylene oxide and has a hydroxyl number in the range from 100 to 350 mg KOH/g and a graft polyol which is prepared by in-situ polymerization of ethylenically unsaturated monomers in a polyether alcohol having the same structure.

The invention accordingly provides a process for producing viscoelastic flexible polyurethane foams by reacting
a) polyisocyanates with
b) compounds having at least two hydrogen atoms which are reactive toward isocyanate groups,
c) blowing agents,
wherein the compounds having at least two hydrogen atoms which are reactive toward isocyanate groups b) comprise
b1) from 0 to 90 parts by weight of at least one polyether alcohol consisting of exclusively propylene oxide units or propylene oxide units and not more than 50% by weight, based on the total weight of the alkylene oxides used, of ethylene oxide units in the polyether chain and having a nominal functionality of from 3 to 8 and a hydroxyl number in the range from 100 to 350 mg KOH/g,
b2) from 10 to 100 parts by weight of at least one graft polyol which can be prepared by in-situ polymerization of olefinically unsaturated monomers in at least one polyether alcohol which has exclusively propylene oxide units or propylene oxide units and not more than 50% by weight, based on the total amount of alkylene oxides used, of ethylene oxide units in the polyether chain, a nominal functionality of 2-8 and a hydroxyl number in the range from 100 to 350 mg KOH/g, having a solids content of not more than 60% by weight, based on the total amount of polyols and solids used,
where the sum of the parts by weight b1) and b2) is 100.

The invention further provides the flexible polyurethane foams produced by the process of the invention.

The polyether alcohol b1) is preferably used in an amount of 5-90 parts by weight, particularly preferably in an amount of 10-90 parts by weight, and the graft polyol is preferably used in an amount of from 10 to 95 parts by weight, particularly preferably in an amount of 10-90 parts by weight, where the sum of the parts by weight of b1) and b2) is 100.

The polyether alcohol b1) preferably has not more than 25% by weight, particularly preferably not more than 15% by weight and in particular not more than 5% by weight, based on the total amount of the alkylene oxides used, of ethylene oxide units in the polyether chain.

The polyether alcohol b1) preferably has a functionality of from 3 to 8, particularly preferably from 3 to 6, in particular from 3 to 4.

The graft polyol b2) preferably has not more than 50% by weight, especially preferably 25% by weight, particularly preferably not more than 15% by weight and in particular not more than 5% by weight, based on the total amount of the alkylene oxides used, of ethylene oxide units in the polyether chain.

The graft polyol b2) preferably has a functionality of from 3 to 6, particularly preferably from the 3 to 4.

In addition to the polyols b1) and b2), the component b) can, as described above, comprise up to 70 parts by weight of at least one polyether alcohol b3) consisting of exclusively propylene oxide units or propylene oxide units and not more than 20% by weight, based on the total amount of the alkylene oxide used, of ethylene oxide units in the polyether chain and having a nominal functionality of 2 and a hydroxyl number in the range from 50 to 350 mg KOH/g.

The sum of the parts by weight of b1, b2 and b3 is preferably greater than 100 and not more than 200 parts by weight, particularly preferably 1-170 parts by weight.

In addition to the polyols b1) and b2), the component b) can comprise up to 30 parts by weight of at least one polyether alcohol b4) consisting of exclusively ethylene oxide units or ethylene oxide units and not more than 20% by weight, based on the total amount of the alkylene oxides used, of propylene oxide units in the polyether chain and having a nominal functionality of 2 and a hydroxyl number in the range from 50 to 550 mg KOH/g.

The sum of the parts by weight of b1, b2 and b4 is preferably greater than 100 and not more than 150 parts by weight, particularly preferably 1-130 parts by weight.

In a further embodiment of the invention, both the polyether alcohol b3) and the polyether alcohol b4) can be used in the amounts indicated.

The sum of the parts by weight of b1, b2, b3 and b4 is preferably greater than 100 and not more than 250 parts by weight, particularly preferably 2-250 parts by weight.

When two alkylene oxides are used for the polyether alcohols b1) to b4), these can be added on in the form of blocks or randomly.

It is in principle possible to use all known compounds having at least two isocyanate groups in the molecule as polyisocyanates a). Preference is given to using diisocyanates. Diphenylmethane diisocyanate (MDI) and/or tolylene diisocyanate (TDI) are preferably used for the process of the invention.

When TDI is used, mixtures of the 2,4 isomer and the 2,6 isomer are usually employed. Commercial mixtures comprising 80% of 2,4-TDI and 60% of 2,6-TDI and 35% of 2,4-TDI and 35% of 2,6-TDI are particularly preferred.

When MDI is used, it is possible to use the pure 4,4' isomer, the pure 2,4' isomer and also any mixtures of the two isomers which can further comprise up to 5% by weight of the 2,2' isomer. Use is frequently made of modified isocyanates in place of the pure isocyanates or in admixture therewith, since pure MDI as a solid is difficult to process. Such modified isocyanates can be formed, for example, by incorporation of groups into the polyisocyanates. Examples of such groups are urethane, allophanate, carbodiimide, uretonimine, isocyanurate, urea and biuret groups. Particular preference is given to isocyanates modified with urethane groups, which are usually prepared by reacting the isocyanates with a substoichiometric amount of H-functional compounds. Such compounds are frequently also referred to as NCO prepolymers. Particular preference is likewise given to carbodiimide- or uretonimine-comprising polyisocyanates which can be formed by targeted catalytic reaction of isocyanates with themselves. Furthermore, it is possible to use mixtures of TDI and MDI.

The polyether alcohols used for the process of the invention can be prepared by the customary and known methods. This is usually achieved by base-catalyzed, usually alkali-catalyzed, addition of lower alkylene oxides, usually ethylene oxide and/or propylene oxide, onto hydroxy-functional starter substances.

As starter substances for the trifunctional polyether alcohols b1), use is usually made of 3-functional alcohols such as glycerol, trimethylolpropane (TMP), triethanolamine, preferably glycerol. In the preparation of the polyether alcohols b3) and b4), bifunctional alcohols are preferably used, for example water, ethylene glycol, propylene glycol or their higher homologues.

In the preparation of the polyether alcohols, it is possible to use the above-mentioned bifunctional and trifunctional starter substances either individually or in the form of any mixtures with one another, depending on the desired functionality.

As alkylene oxides, use is usually made, as mentioned above, of ethylene oxide and/or propylene oxide. These can be added on individually, in succession or as a mixture.

In one embodiment of the polyether alcohols used according to the invention, multimetal cyanide compounds, also referred to as DMC catalysts, can be used as catalyst in place of basic compounds. This is particularly advantageous in the case of the polyether alcohols which are made up entirely or substantially of propylene oxide. Such polyether alcohols have, in particular, a low content of unsaturated compounds, preferably less than 0.010 meq/g.

Polyol b1) should preferably have a block structure having a terminal block composed of ethylene oxide. The polyols b2), b3) and b4) can have any desired structures, with polyol b2) preferably having a terminal block composed of ethylene oxide.

Graft polyols b2) are, as mentioned above, polyether alcohols in which olefinically unsaturated monomers have been polymerized in situ. Preferred olefinically unsaturated monomers are styrene and acrylonitrile. Preference is given to graft polyols prepared by polymerization of olefinically unsaturated monomers in a carrier polyol and having a hydroxyl number in the range from 100 to 350 mg KOH/g. The solids content is preferably at least 5, 15, particularly preferably 25 and in particular 45% by weight and not more than 60% by weight, based in each case on the weight of the graft polyol. The polymers are present in the polyether alcohol in the form of a dispersion. The dispersion is stable, i.e. no settling of the particles occurs. The graft polyols have, depending on the solids content, a hydroxyl number in the range 40-330 mg KOH/g. The hydroxyl number is preferably at least 50-230 mg KOH/g, particularly preferably 60-200 mg KOH/g.

The hydroxyl number of the graft polyol b2) is preferably calculated according to the formula (Hydroxyl number of graft polyol=hydroxyl number of carrier polyol×(100−S)/100.

Here, F is the numerical value of the solids content of the graft polyol in % by weight, based on the weight of the graft polyol.

In a preferred embodiment of the invention, the same polyols as are used as component b1) are used as polyols in which the polymerization is carried out, also referred to as carrier polyols. To calculate the hydroxyl number of the graft polyol, it is then possible to use the above formula in which the hydroxyl number of the carrier polyols is then equal to the hydroxyl number of the polyol b1).

The graft polyols b2) can, as described above, be prepared by free-radical polymerization of the monomers, preferably acrylonitrile, styrene and, if appropriate, further monomers, a macromer, a moderator using a free-radical initiator, usually azo or peroxide compounds, in a polyether alcohol or polyesterol, frequently referred to as carrier polyol, as continuous phase.

The graft polyols b2) are particularly preferably prepared by in-situ polymerization of acrylonitrile, styrene or preferably mixtures of styrene and acrylonitrile, e.g. in a weight ratio of from 90:10 to 10:90, preferably from 70:30 to 30:70.

Carrier polyols used are, as described, in particular polyether alcohols having the features described under b1).

The graft polyols can also be prepared by the seed process. In this process, a first graft polyol is firstly prepared from a polyol and monomers and this first graft polyol is reacted with further monomers in a second step to give the finished graft polyol. This process is employed particularly when graft polyols having a bimodal particle size distribution, i.e. having two peaks in the distribution curve of the particles, are to be prepared.

Macromers, also referred to as stabilizers, are linear or branched polyether alcohols which have molecular weights of ≥1000 g/mol and comprise at least one terminal, reactive olefinically unsaturated group. The ethylenically unsaturated group can be inserted into an existing polyol by reaction with carboxylic anhydrides such as maleic anhydride, fumaric acid, acrylate and methacrylate derivatives and also isocyanates derivatives such as 3-isopropenyl-1,1-dimethylbenzyl isocyanate, isocyanatoethyl methacrylates. A further route is the preparation of a polyol by alkoxidation of propylene oxide and ethylene oxide using starter molecules having hydroxyl groups and ethylenic unsaturation. Examples of such macromers are described, for example, in WO 01/04178 and U.S. Pat. No. 6,013,731.

During the free-radical polymerization, the macromers are built into the copolymer chain. This results in formation of block copolymers having a polyether block and a poly(acrylonitrile-styrene) block, which in the interface of continuous phase and disperse phase act as phase compatibilizers and suppress agglomeration of the graft polyol particles. The proportion of macromers is usually from 1 to 15% by weight, based on the total weight of the monomers used for preparing the graft polyol.

Moderators, also referred to as chain transfer agents, are usually used for preparing graft polyols. The use and the function of these moderators is described, for example, in U.S. Pat. No. 4,689,354, EP 0 365 986, EP 0 510 533 and EP 0 640 633, EP 008 444, EP 0731 118 B1. The moderators effect a chain transfer of the growing free radical and thus reduce the molecular weight of the copolymers being formed, as a result of which crosslinking between the polymer molecules is reduced, which influences the viscosity and the dispersion stability and also the filterability of the graft polyols. The proportion of moderators is usually from 0.5 to 25% by weight, based on the total weight of the monomers used for preparing the graft polyol. Moderators which are customarily used for preparing graft polyols are alcohols such as 1-butanol, 2-butanol, isopropanol, ethanol, methanol, cyclohexane, toluene, mercaptans, such as ethanethiol, 1-heptanethiol, 2-octanethiol, 1-dodecanethiol, thiophenol, 2-ethylhexyl thioglycolate, methyl thioglycolate, cyclohexyl mercaptan and also enol ether compounds, morpholines and α-(benzoyloxy)styrene.

To initiate the free-radical polymerization, it is usual to use peroxide or azo compounds such as dibenzoyl peroxide, lauroyl peroxide, t-amyl peroxy-2-ethylhexanoate, di-t-butyl peroxide, diisopropyl peroxide carbonate, t-butyl peroxy-2-ethylhexanoate, t-butyl perpivalate, t-butyl perneodecanoate, t-butyl perbenzoate, t-butyl percrotonate, t-butyl perisobutyrate, t-butyl peroxy-1-methylpropanoate, t-butyl peroxy-2-ethylpentanoate, t-butyl peroxyoctanoate and di-t-butyl perphthalate, 2,2'-azobis(2,4-dimethylvaleronitrile), 2,2'-azobisisobutyronitrile (AIBN), dimethyl-2,2'-azobisisobutyrate, 2,2'-azobis(2-methylbutyronitrile) (AMBN), 1,1'-azobis(1-cyclohexanecarbonitrile). The proportion of initiators is usually from 0.1 to 6% by weight, based on the total weight of the monomers used for preparing the graft polyol.

The free-radical polymerization for preparing graft polyols is, owing to the reaction rate of the monomers and the half life of the initiators, usually carried out at temperatures of from 70 to 150° C. and a pressure of up to 20 bar. Preferred reaction conditions for preparing graft polyols are temperatures of from 80 to 140° C. and a pressure ranging from atmospheric pressure to 15 bar.

In a preferred embodiment of the process of the invention, the graft polyols have a bimodal particle size distribution, as described in WO 03/078496.

Chain extenders and crosslinkers can also be used together with the compounds having at least 2 groups which are reactive toward isocyanate. These are preferably H-functional compounds having molecular weights of from 62 to 400 g/mol, in particular 2- to 3-functional alcohols, amines or amino alcohols. Their amount is, in particular, from 0 to 25 parts by weight, preferably from 2 to 12 parts by weight, based on 100 parts by weight of polyether alcohol and/or polyester alcohols.

The flexible polyurethane foams of the invention are usually produced in the presence of blowing agents, catalysts and auxiliaries and/or additives.

As blowing agent, preference is given to using water. The amount of the water used depends on the desired density of the foam and is preferably in the range 1-5% by weight, based on the weight of the component b).

In place of or together with the water, it is also possible to use physically acting blowing agents. These are preferably liquids which are inert toward the polyurethane formation components and have boiling points of less than 100° C., preferably less than 50° C., in particular in the range from 50 to 30° C., and vaporize under the influence of the exothermic polyaddition reaction. Examples of such liquids are hydrocarbons such as n-pentane, isopentane and/or cyclopentane, ethers, ketones, halogenated hydrocarbons as long as they have no ozone depletion potential or noble gases. The amount of these physically acting blowing agents is usually from 1 to 20 parts by weight, preferably from 2 to 15 parts by weight, based on 100 parts by weight of the compound having at least 2 hydrogen atoms which are reactive toward isocyanate. The amount of blowing agents used depends on the desired density of the foams.

To carry out the reaction, the customary polyurethane catalysts are usually employed. These are, for example, tertiary amines such as triethylenediamine, metal salts such as tin compounds and also any mixtures of these compounds.

Auxiliaries and/or additives used are, for example, flame retardants, surface-active substances, stabilizers, cell regulators, fungistatic and bacteriostatic substances, antistatics, dyes, pigments and fillers. These materials are added to the foam system when required in order to give it particular properties.

Further details regarding the components used may be found, for example, in Kunststoff-Handbuch, Volume VII Polyurethane, Carl Hanser Verlag, Munich, Vienna, 1st to 3rd Edition, 1966, 1983 and 1993.

The compounds having at least two hydrogen atoms which are reactive toward isocyanate groups b), the blowing agents c), the catalysts and any auxiliaries and/or additives used are usually mixed to form a polyol component and reacted in this form with the polyisocyanates a).

To produce the flexible polyurethane foams of the invention, the starting compounds are usually reacted at temperatures of from 0 to 100° C., preferably from 15 to 60° C., in such ratios that from 0.5 to 2, preferably from 0.8 to 1.3 and in particular about 1, reactive hydrogen atom(s) is/are present per NCO group and, when water is used as blowing agent, the two hydrogen atoms of the water are included in the calculation of the total number of reactive hydrogen atoms.

The flexible polyurethane foams of the invention are preferably produced by the one-shot process by mixing the polyol and isocyanate components, with the polyol component comprising, as described above, the compounds having at least two hydrogen atoms which are reactive toward isocyanate, if appropriate the monools and also catalysts, blowing agents and also auxiliaries and/or additives and the isocyanate component comprising the polyisocyanate and also, if appropriate, catalysts, physical blowing agents and also auxiliaries and/or additives. The two components are intensively mixed and usually foamed as slabstock foam.

The flexible polyurethane foams of the invention display excellent viscoelastic properties since their glass transition temperature is in the vicinity of room temperature.

The glass transition temperature is, as described above, determined by means of dynamic-mechanical analysis (DMA) at a frequency of 1 Hz in a temperature range from −80 to +200° C. at a deformation of 0.3%. The temperature program is carried out in 5° C. steps. The viscoelastic flexible foams of the invention have a glass transition temperature indicated by an absolute maximum value of the loss modulus tan delta in the temperature range from −10 to 40° C., preferably from −10 to 35° C. and in particular from −6 to 35° C. The viscoelastic foams have, in particular, a rebound resilience in accordance with DIN EN ISO 8307 of less than 30% and also a high damping behavior which is reflected in a value for tan delta of >0.2 at room temperature.

They are used, in particular, for insulating and damping elements, in particular in vehicle construction, for upholstered furniture or furniture for sitting or lying, for mattresses or cushions in the orthopedic and/or medical sector or for shoe soles or insoles. Further uses are safety components of automobiles, surfaces for depositing things, armrests and similar parts in the furniture sector and in automobile construction.

The invention is illustrated by the following examples.

1. Preparation of the Graft Polyols

General Method

The graft polyols were prepared in a 4 liter glass flask provided with single-stage stirrer, superposed reflux condenser and electric heating mantel. Before commencement of the reaction, the reactor was filled with a mixture of carrier polyol, in the case of bimodal graft polyols also a monomodal graft polyol as seed and part of the macromer, flushed with nitrogen and heated to the synthesis temperature of 125° C. The remaining amount of macromer was fed in during the synthesis. The remaining part of the reaction mixture, comprising further carrier polyol, initiator and the monomers, was placed in two metering vessels. The synthesis of the graft polyols was carried out by transferring the raw materials at a constant metering rate via a static in-line mixer into the reactor. The metering time for the monomer/moderator mixture was 150 minutes, while the polyol/initiator mixture was metered into the reactor over a period of 165 minutes. After a further after-reaction time of 10 minutes at 125° C., the product was freed of the unreacted monomers and other volatile compounds at a temperature of 135° C. under reduced pressure (<0.1 mbar). The end product was stabilized with antioxidants.

Carrier Polyols

Polyol 1

Polyether polyol derived from glycerol, propylene oxide and ethylene oxide Hydroxyl number: 35 mg KOH/g Polyol 1 is a carrier polyol for the noninventive graft polyol 4.

Polyol 2

Polyether polyol derived from glycerol, propylene oxide and ethylene oxide Hydroxyl number: 170 mg KOH/g Polyol 2 is a carrier polyol for the graft polyols 1-3 according to the invention.

Macromers

Macromer 1

Unsaturated polyether polyol derived from sorbitol, propylene oxide, ethylene oxide and meta-isopropenylbenzyl isocyanate OH number: 19.5 mg KOH/g Viscosity: 3200 mPas at 25° C.

Macromer 1 is used for synthesizing graft polyols according to the above general method.

Graft Polyols

Graft polyol 1

Monomodal graft polyol in polyol 2

Solid: Poly(acrylonitrile-co-styrene), mass ratio of ACN:STY=1:2

Solids content: 45% by weight based on the total mass of the dispersion

OH number: 110 mg KOH/g

Carrier polyol: Polyol 2

Initiator: Azo free-radical initiator

Moderator: n-Dodecanethiol (1% by weight based on monomer)

Macromer: Macromer 1

The graft polyol 1 is intermediate for the preparation of the graft polyols 2 and 3.

Graft polyol 2:

Bimodal graft polyol in polyol 2 (example according to the invention)

Seed: Graft polyol 1 (7.5% by weight based on total amount)

Solid: Poly(acrylonitrile-co-styrene), mass ratio of ACN:STY=1:2

Solids content: 45% by weight based on the total mass of the dispersion

OH number: 91.8 mg KOH/g

Viscosity: 2638 mPas at 25° C.

Carrier polyol: Polyol 2

Initiator: Azo free-radical initiator

Moderator: n-Dodecanethiol (1% by weight based on monomer)
Macromer: Macromer 1
  Graft polyol 3:
Bimodal graft polyol in polyol 2 (example according to the invention)
Seed: Graft polyol 1 (7.5% by weight based on total amount)
Solid: Poly(acrylonitrile-co-styrene), mass ratio of ACN:STY=1:2
Solids content: 47% by weight based on the total mass of the dispersion
OH number: 83.7 mg KOH/g
Viscosity: 2593 mPas at 25° C.
Carrier polyol: Polyol 2
Initiator: Azo free-radical initiator
Moderator: n-Dodecanethiol (1.05% by weight based on monomer)
Macromer: Macromer 1
  Graft polyol 4:
Bimodal graft polyol in polyol 1 (noninvention example, reference)
Seed: Graft polyol 1 (7.5% by weight based on total amount)
Solid: Poly(acrylonitrile-co-styrene), mass ratio of ACN:STY=1:2
Solids content: 45% by weight based on the total mass of the dispersion
OH number: 20 mg KOH/g
Viscosity: 9000 mPas at 25° C.
Carrier polyol: Polyol 1
Initiator: Azo free-radical initiator
Moderator: n-Dodecanethiol (1.05% by weight based on monomer)
Macromer: Macromer 1
Polyol 3 Polyether alcohol based on propylene glycol and propylene oxide, hydroxyl number: 55 mg KOH/g
Polyol 4 Polyether alcohol based on propylene glycol and propylene oxide, hydroxyl number: 250 mg KOH/g
Polyol 5 Polyether alcohol based on ethylene glycol and ethylene oxide, hydroxyl number: 190 mg KOH/g
Catalyst 1 Lupragen® N201—amine catalyst from BASF SE
Catalyst 2 Lupragen® N206—amine catalyst from BASF SE
Catalyst 3 Kosmos® 29—tin catalyst from Air Products
Stabilizer 1 NIAX Silicone L-627 from General Electrics 2. Production of the Foams A polyol component was prepared by mixing the polyols, catalysts and additives indicated in the table. The amounts indicated are parts by weight. The polyol component was mixed manually with 100 parts by weight of tolylene diisocyanate 80/20 at the index indicated in Examples 1 to 6 and the mixture was placed in an open metal mold having the dimensions 40×40×40 cm, where it cured to form the flexible foam.

The composition of the formulation, the foaming parameters and mechanical properties of the foams are indicated in Table 1.

The noninventive Examples No. 1 and 2 are also included in Table 1 for reference.

TABLE 1

| Component | Unit | non-inventive example 1 | non-inventive example 2 | 3 | 4 | 5 | 6 | 7 |
|---|---|---|---|---|---|---|---|---|
| Graft polyol 2 | % by weight based on total polyol | | | 20 | 40 | | | |
| Graft polyol 3 | % by weight based on total polyol | | | | | 20 | 20 | 40 |
| Graft polyol 4 | % by weight based on total polyol | 20 | 40 | | | | | |
| Polyol 2 | % by weight based on total polyol | 80 | 60 | 80 | 60 | 20 | 50 | 30 |
| Polyol 3 | % by weight based on total polyol | | | | | 15 | 10 | 10 |
| Poylol 4 | % by weight based on total polyol | | | | | 25 | | |
| Polyol 5 | % by weight based on total polyol | | | | | 25 | 20 | 20 |
| Catalyst 1 | % by weight based on total polyol | 0.10 | 0.10 | 0.10 | 0.10 | 0.07 | 0.07 | 0.07 |
| Catalyst 2 | % by weight based on total polyol | 0.15 | 0.15 | 0.15 | 0.15 | 0.20 | 0.20 | 0.20 |
| Catalyst 3 | % by weight based on total polyol | 0.05 | 0.05 | 0.05 | 0.05 | 0.19 | 0.19 | 0.19 |
| Stabilizer 1 | % by weight based on total polyol | 1.20 | 1.20 | 1.20 | 1.20 | 1.20 | 1.20 | 1.20 |
| Water | % by weight based on total polyol | 1.60 | 1.60 | 1.60 | 1.60 | 2.20 | 2.20 | 2.20 |
| TDI | % by weight based on total isocyanate | 100 | 100 | 100 | 100 | 100 | 100 | 100 |
| Index | | 95 | 95 | 95 | 95 | 95 | 95 | 95 |
| Properties | | 1 | 2 | 3 | 4 | 5 | 6 | 7 |
| Fiber time | s | 125 | 135 | 112 | 107 | 137 | 62 | 57 |
| Foam density | g/l | 50.5 | 48.9 | 51 | 50.5 | 43.9 | 44.0 | 43.4 |
| Compressive strength | kPa | 3 | 4.3 | 3.1 | 4.3 | 1.7 | 2.2 | 2.4 |
| Rebound resilience | % | 5 | 13 | 3 | 5 | 8 | 8 | 11 |

The foam density was determined in accordance with DIN EN ISO 845, the compressive strength was determined in accordance with DIN EN ISO 3386-1, and the rebound resilience (reb. res.) was determined in accordance with DIN EN ISO 8307.

The invention claimed is:

1. A process for producing viscoelastic flexible polyurethane foams by reacting
   a) polyisocyanates with
   b) compounds having at least two hydrogen atoms which are reactive toward isocyanate groups,
   c) blowing agents,
   wherein the compounds having at least two hydrogen atoms which are reactive toward isocyanate groups b) comprise
   b1) from 5 to 90 parts by weight of at least one polyether alcohol consisting of exclusively propylene oxide units or propylene oxide units and not more than 50% by weight, based on the total weight of the alkylene oxides used, of ethylene oxide units in the polyether chain and having a nominal functionality of from 3 to 8 and a hydroxyl number in the range from 100 to 350 mg KOH/g, and
   b2) from 10 to 95 parts by weight of at least one graft polyol which can be prepared by in-situ polymerization of olefinically unsaturated monomers in at least one polyether alcohol which has exclusively propylene oxide units or propylene oxide units and not more than 50% by weight, based on the total amount of alkylene oxides used, of ethylene oxide units in the polyether chain, wherein said graft polyol has a nominal functionality of from 2 to 8 and a hydroxyl number in the range from 100 to 350 mg KOH/g, having a solids content of not more than 60% by weight, based on the total amount of polyols and solids used,
   where the sum of the parts by weight of b1) and b2) is 100; and
   wherein the graft polyol b2) is prepared by in-situ polymerization of olefinically unsaturated monomers in said polyether alcohol b1).

2. The process according to claim 1, wherein polyether alcohol b1) has 25% by weight, based on the total amount of the alkylene oxides used, of ethylene oxide units in the polyether chain.

3. The process according to claim 1, wherein the polyether alcohol b1) has 15% by weight, based on the total amount of the alkylene oxides used, of ethylene oxide units in the polyether chain.

4. The process according to claim 1, wherein the polyether alcohol b1) has 5% by weight, based on the total amount of the alkylene oxides used, of ethylene oxide units in the polyether chain.

5. The process according to claim 1, wherein the polyether alcohol b1) has a functionality of from 3 to 6.

6. The process according to claim 1, wherein the polyether alcohol b1) has a functionality of from 3 to 4.

7. The process according to claim 1, wherein the graft polyol b2) has 25% by weight, based on the total amount of the alkylene oxides used, of ethylene oxide units in the polyether chain.

8. The process according to claim 1, wherein the graft polyol b2) has 15% by weight, based on the total amount of the alkylene oxides used, of ethylene oxide units in the polyether chain.

9. The process according to claim 1, wherein the graft polyol b2) has 5% by weight, based on the total amount of the alkylene oxides used, of ethylene oxide units in the polyether chain.

10. The process according to claim 1, wherein the graft polyol b2) has a functionality of from 3 to 6.

11. The process according to claim 1, wherein the graft polyol b2) has a functionality of from 3 to 4.

12. The process according to claim 1, wherein the component b) has, in addition to the 100 parts by weight of the polyether alcohols b1) and b2), up to 70 parts by weight of at least one polyether alcohol b3) consisting of exclusively propylene oxide units or propylene oxide units and not more than 20% by weight, based on the total amount of the alkylene oxide units, of ethylene oxide units in the polyether chain and having a nominal functionality of 2 and a hydroxyl number in the range from 50 to 350 mg KOH/g, where the sum of the parts by weight of b1, b2 and b3 is greater than 100 and not more than 170 parts by weight.

13. The process according to claim 1, wherein the component b) has, in addition to the 100 parts by weight of the polyether alcohols b1) and b2), up to 30 parts by weight of at least one polyether alcohol b4) consisting of exclusively ethylene oxide units or ethylene oxide units and not more than 20% by weight, based on the total weight of the alkylene oxides used, of propylene oxide units in the polyether chain and having a nominal functionality of from 2 to 3 and a hydroxyl number in the range from 50 to 550 mg KOH/g, where the sum of the parts by weight of b1, b2 and b3 is greater than 100 and not more than 130 parts by weight.

14. The process according to claim 1, wherein the component b) comprises, in addition to the 100 parts by weight of the polyether alcohols b1) and b2), up to 70 parts by weight of at least one polyether alcohol b3) and up to 30 parts by weight of at least one polyether alcohol b4), where the sum of the parts by weight of b1, b2 and b3 is greater than 100 and not more than 170 parts by weight.

15. The process according to claim 1, wherein the hydroxyl number of the graft polyol b2) is calculated according to the formula Hydroxyl number of graft polyol=hydroxyl number of carrier polyol×(100−$S$)/100, where
   $S$ is the numerical value of the solids content of the graft polyol in % by weight, based on the weight of the graft polyol, and the hydroxyl number of the carrier polyol is equal to the hydroxyl number of polyol b1).

* * * * *